Oct. 24, 1967     E. A. PICHETTE     3,348,437
OFFSET-ADJUSTABLE TOOL HOLDER
Filed Jan. 5, 1966
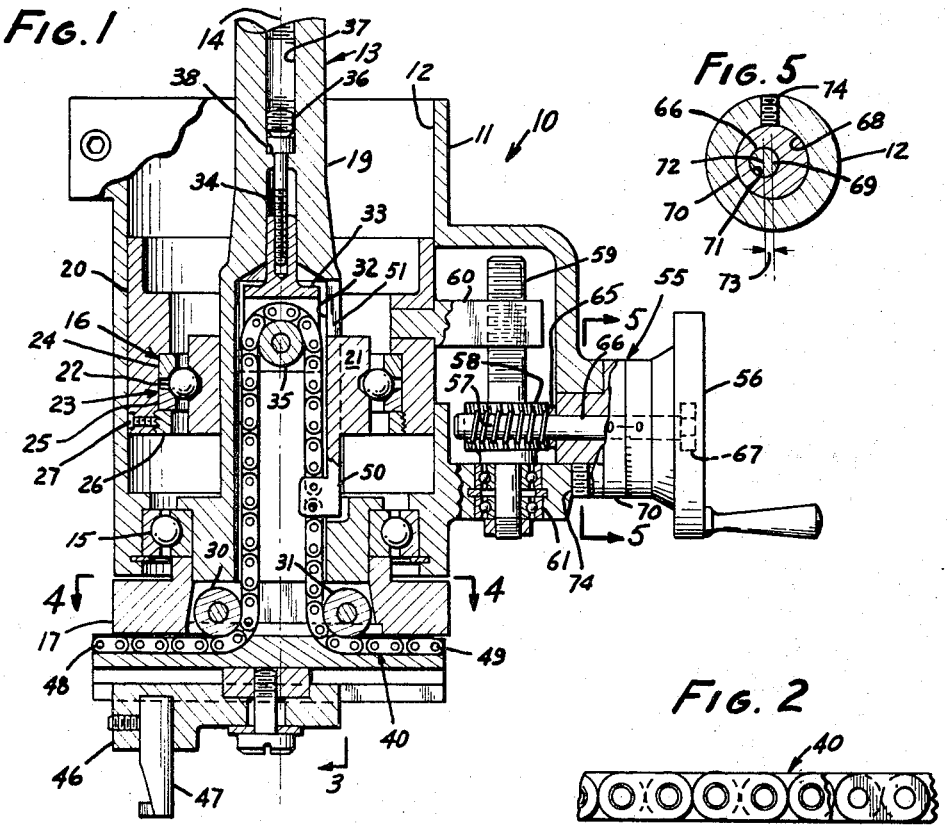
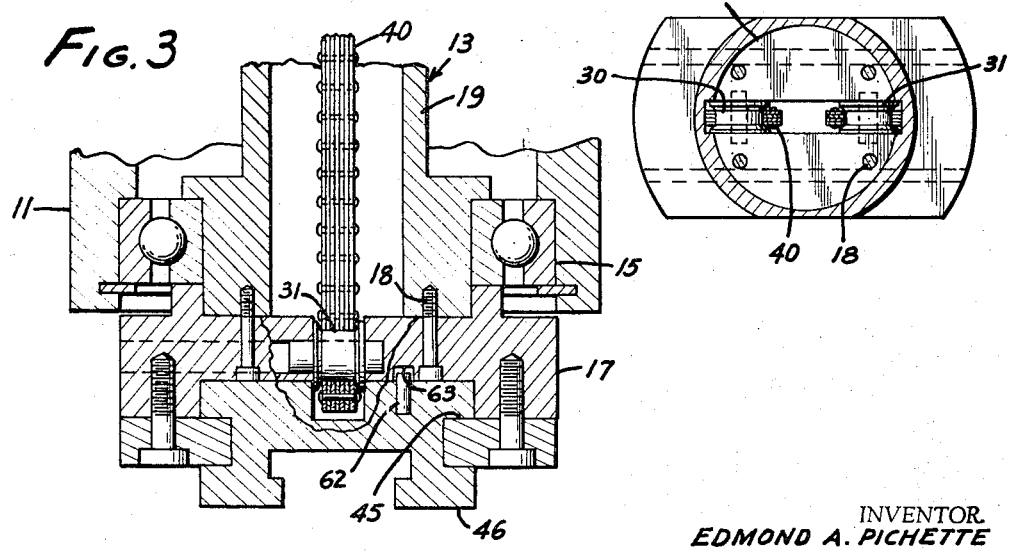
INVENTOR.
EDMOND A. PICHETTE
BY
ATTORNEYS.

United States Patent Office 3,348,437
Patented Oct. 24, 1967

3,348,437
OFFSET-ADJUSTABLE TOOL HOLDER
Edmond A. Pichette, 14304 San Feliciano Drive,
La Mirada, Calif. 90638
Filed Jan. 5, 1966, Ser. No. 518,847
10 Claims. (Cl. 82—2)

This invention relates to a tool holder adapted adjustably to position a tool relative to its axis of rotation.

There is a widespread need in the machining art for tool holders adapted to move a tool laterally relative to an axis of rotation. Uses for this type of device are in facing, boring and the like. Previous attempts to supply such a tool holder have not been especially successful largely because of problems relating to backlash and other tolerance problems inherent in the construction of the devices. It is an object of this invention to provide a tool holder of the aforesaid type wherein backlash and other tolerance problems are substantially eliminated.

A tool holder according to this invention has an axis of rotation, and is adapted to shift a tool laterally relative to this axis. It includes a body which is adapted to be attached to a non-rotating structure. A shaft is rotatably mounted in the body and adapted to be turned by motive means, this shaft having an axis of rotation. A tool slideway extends laterally on the shaft, and a tool slide is shiftably mounted in this tool slideway. A pair of channel-forming idler wheels is mounted to the shaft, as is a bight-forming idler wheel. A flexible, non-extensible, slide-shifting means having a dimension of length is mounted in at least two points to the tool slide on opposite sides laterally of the pair of channel-forming idler wheels. It extends axially between the idler wheels and in contact with them to form a channel and over the bight-forming idler wheel to form a bight.

An axially movable adjustment link is rotatably and slidably mounted in the body. It engages the slide-shifting means. An adjustment block is axially, shiftably mounted to the body and is engaged to the adjustment means so as to shift the same. Shifting of the adjustment means causes the slide adjustment means to move the slide laterally of the said axis.

According to a preferred but optional feature of the invention, the slide-shifting means is a chain.

According to still another preferred but optional feature of the invention, the bight-forming idler wheel is mounted to an axially movable take-up block whereby to adjust the tension in the slide-shifting means.

The above and other features of this invention will be fully understood from the following detailed description and the accompanying drawings in which:

FIG. 1 is a side elevation partly in cutaway cross-section showing the presently preferred embodiment of the invention;

FIG. 2 is a side view of a fragment of FIG. 1;

FIG. 3 is a fragmentary cross-section taken at line 3—3 of FIG. 1; and

FIGS. 4 and 5 are cross-sections taken at lines 4—4 and 5—5, respectively, of FIG. 1.

The tool holder 10 includes a body 11 adapted to be attached to stationary machine tool structure such as the frame of a milling machine. A cavity 12 inside the body encloses a shaft 13 which is rotatable about an axis of rotation 14. The shaft is attached to a rotating element of a machine tool. It is supported inside the body by a first bearing 15 and a second bearing 16. The shaft has an enlargement 17 which is attached by means such as screws 18 (FIG. 4) to the upper portion 19 of the shaft. This construction enables the first bearing to be clamped in place.

The second bearing is held between an adjustment block 20, which is slidably fitted in the cavity, and the upper part of the shaft. Block 20 makes a very accurate sliding fit in the cavity. Bearing 16 includes an inner race 21 having a groove to receive balls 22. It also includes an outer race 23 which has two portions 24, 25, these being spaced apart from each other and biased toward each other and against the balls by means of a ring 26 which is threaded against portion 25 and held in place by a set screw 27.

The shaft carries a pair of channel-forming idler wheels 30, 31 which are spaced apart from each other and journaled to the shaft. Within a bore 32 in the shaft, there is positioned a take-up block 33 which is drawn upwardly by means of an adjustment screw 34. Adjustment screw 34 is held locked by a set screw 36 threaded into another bore 37 in which the head of the adjustment screw is located. The head bears against a shoulder 38 at the bottom of bore 37. Set screw 36 holds block 33 in an adjusted position.

Block 33 carries a bight-forming idler wheel 35. A flexible, non-extensible slide-shifting means 40 is formed into a channel around the two channel-forming idler wheels and into a bight by being passed over the bight-forming idler wheel. The presently preferred embodiment of slide-shifting means is shown in FIGS. 1–3. This is a multiple ply chain, preferably ground to a high degree of smoothness on both sides so as to provide a substantially continuous contact with the idler wheels. In addition to chains, other flexible, non-extensible means such as cables may be used, provided that they do not have any substantial elongation under tension. However, this chain has been found to give the smoothest action of any means considered.

A tool slideway 45 is attached to the bottom of the shaft and extends laterally relative to the axis of rotation. A tool slide 46 is slidable in the slideway and is adapted to carry a tool 47 for lateral movement relative to the central axis of rotation. The chain 40 is attached at positions 48, 49 to the tool slide so that motion in the direction of length of the chain will cause a corresponding amount of lateral motion of the tool slide and of the tool.

Adjustment link 50 is attached to the chain in a slot 51 in the shaft so as to be axially movable. This axial motion of the adjustment link, caused by motion of the adjustment block, provides the lateral adjustment of the tool. This motion is accomplished by an adjustment means 55 which includes a hand wheel 56 which drives a worm 57 that in turn drives a worm gear 58. The worm gear turns a screw shaft 59 that is threaded into an extension 60 of the adjustment block. Screw shaft 59 is cantilevered by a pair of bearings 61 in the body.

A shoulder 65 is formed on shaft 66, which shaft carries the worm. This shoulder bears against a face of adjustment means 55, and the right-hand end of shaft 66, in FIG. 1, is held by a nut 67 which bears against the opposite face of the adjustment means. Therefore shaft 66 is axially locked in place relative to the adjustment means.

Adjustment means 55 also includes a device for lateral positioning of shaft 66 so as to adjust the position of worm 57 relative to worm gear 58. This provides a means for making a very exact relative adjustment of these two elements and completely eliminates backlash problems between them. This adjustment feature is best shown in FIG. 5 where body 12 is shown with a bearing 68 having a center 69. An insert 70 fits into bearing 68 and has a center port 71 with a center 72. Shaft 66 fits in port 71. Therefore, rotation of insert 70 will move shaft 66 around center 69 on a circle determined by the offset 73 between the two centers, and thereby makes a suitable lateral adjustment between the worm and worm gear. In one embodiment of the invention, the offset was made 0.050 inch to good advantage. Set screw 74 holds the insert in an adjusted position. This is, as a practical matter, a one-time adjustment for a given device, because wear in the worm gear is negligible.

Set screw 74 also holds the entire adjustment means to the body. Frictional engagement has been formed to be adequate for this function, but if desired, the insert could be grooved, the better to restrain the adjustment means against axial separative movement from the body.

Hand wheel 56 is keyed to shaft 66 by means not shown, such as a key or a set screw so that these turn together to rotate the worm.

It will be seen that the device is easily set up and is quite free of looseness and backlash. On setting up the device, the chain is tightened as desired by pulling up on the take-up block, thereby removing all backlash effects from the chain. The position of the tool is adjusted by turning hand wheel 56 until the desired amount of offset is attained. The worm and worm gear act as a locking joint so as to hold the adjustment. The body and the adjustment means remain stationary, and the shaft rotates inside the two bearings. Especial attention is called to second bearing 16 which also serves to remove tolerance errors from the system. The adjustment of the bearings is completely set by ring 26, removing all axial play from this bearing.

The gear trains in the adjustment means can obviously be made to very high tolerance and need not include any backlash effects.

A safety pin 62 is carried by the tool slide and rides in a safety groove 63 in the tool holder slideway. In the unlikely event that the chain should break as the result of misuse or otherwise, the pin will engage the shaft at the end of the groove, and the tool holder will not fly out of the tool holder slideway.

A running adjustment can be made because the adjustment means remains stationary and can move axially up and down in FIG. 1 independently of the rotation of the shaft itself.

There is thus provided a highly accurate, readily manufactured, and reliable means for offsetting a tool relative to an axis of rotation.

This invention is not to be limited by the embodiment shown in the drawings and described in the description which is given by way of example and not of limitation, but only in accordance with the scope of the appended claims.

I claim:
1. A tool holder having an axis of rotation and adapted to shift a tool laterally relative to said axis of rotation, comprising: a body adapted to be attached to non-rotating structure; a shaft rotatably mounted in said body and adapted to be turned by motive means, said shaft having an axis of rotation; a tool slideway extending laterally on the shaft; a tool slide shiftably mounted in said tool slideway; a pair of channel-forming idler wheels mounted to said shaft; a bight-forming idler wheel mounted to said shaft; a flexible, non-extensible, slide-shifting means having a dimension of length, said slide-shifting means being fixed to the tool slide at two points on the tool slide on opposite sides laterally of the pair of channel-forming idler wheels, and extending axially between and in contact with them to form a channel, and over the bight-forming idler wheel to form a bight; an axially movable adjustment link rotatably and slidably mounted in the body and engaging said slide-shifting means; an adjustment block axially shiftably mounted to the body and engaged to adjustment means so constructed and arranged as to shift the adjustment block and thereby the adjustment link, thus to move the tool slide laterally as a result of moving the slide-shifting means along its dimension of length.

2. A tool holder according to claim 1 in which the bight-forming idler wheel is mounted to an axially movable take-up block, whereby to adjust the tension in the slide-shifting means.

3. A tool holder according to claim 1 in which the adjustment link and the adjustment block are joined by a bearing, said last-named bearing including an inner race joined to the adjustment link and a split outer race, having a pair of parts to bear in opposition upon balls held between them while said parts remain out of contact with each other and a bearing-loading ring forcing the two parts against the balls, whereby to remove axial play from the bearing.

4. A tool holder according to claim 1 in which the slide-shifting means is a chain.

5. A tool holder according to claim 1 in which the adjustment means comprises a worm and a worm gear, a shaft driven by the worm gear, and a thread on said last-named shaft, the adjustment block being threadedly mounted to the adjustment block.

6. A tool holder according to claim 5 in which the worm is carried by a shaft and in which said last-named shaft is eccentrically mounted to said body, whereby to make the worm and worm gear relative laterally adjustable.

7. A tool holder according to claim 1 in which the slide-shifting means is a chain, and in which the bight-forming idler wheel is mounted to an axially movable take-up block, whereby to adjust the tension in the slide-shifting means.

8. A tool holder according to claim 7 in which the adjustment link and the adjustment block are joined by a bearing, said last-named bearing including an inner race joined to the adjustment link and a split outer race, having a pair of parts to bear in opposition upon balls held between them while said parts remain out of contact with each other and a bearing-loading ring forcing the two parts against the balls, whereby to remove axial play from the bearing.

9. A tool holder according to claim 8 in which the adjustment means comprises a worm and a worm gear, a shaft driven by the worm gear, and a thread on said last-named shaft, the adjustment block being threadedly mounted to the adjustment block.

10. A tool holder according to claim 8 in which the worm is carried by a shaft and in which said last-named shaft is eccentrically mounted to said body, whereby to make the worm and worm gear relative laterally adjustable.

References Cited

FOREIGN PATENTS 661,714   6/1938   Germany.

WILLIAM W. DYER, Jr., *Primary Examiner.*

LEONIDAS VLACHOS, *Examiner.*